(12) United States Patent
Scheimann

(10) Patent No.: US 7,566,469 B2
(45) Date of Patent: Jul. 28, 2009

(54) METHOD OF DEWATERING GRAIN STILLAGE SOLIDS

(75) Inventor: David W. Scheimann, Joliet, IL (US)

(73) Assignee: Nalco Company, Naperville, IL (US)

( * ) Notice: Subject to any disclaimer, the term of this patent is extended or adjusted under 35 U.S.C. 154(b) by 312 days.

(21) Appl. No.: 10/683,739

(22) Filed: Oct. 13, 2003

(65) Prior Publication Data

US 2005/0079270 A1    Apr. 14, 2005

(51) Int. Cl.
*C12H 1/00*    (2006.01)
(52) U.S. Cl. .......................... 426/424; 426/7; 426/630; 426/635; 426/807; 426/623; 210/733
(58) Field of Classification Search .................. 426/623, 426/630, 635, 807, 7, 424; 210/733
See application file for complete search history.

(56) References Cited

U.S. PATENT DOCUMENTS

| | | | | | |
|---|---|---|---|---|---|
| 4,173,532 | A | * | 11/1979 | Keoteklian | 210/631 |
| 4,479,879 | A | * | 10/1984 | Hashimoto et al. | 210/727 |
| 4,599,390 | A | * | 7/1986 | Fan et al. | 526/240 |
| 4,647,382 | A | * | 3/1987 | Sharpe, Jr. | 210/710 |
| 5,366,637 | A | * | 11/1994 | Turunc | 210/728 |
| 5,433,863 | A | * | 7/1995 | Braden et al. | 210/708 |
| 5,662,810 | A | * | 9/1997 | Willgohs | 210/781 |
| 5,958,233 | A | * | 9/1999 | Willgohs | 210/259 |
| 6,132,625 | A | * | 10/2000 | Moffett | 210/727 |
| 6,217,778 | B1 | * | 4/2001 | Shing et al. | 210/708 |
| 6,294,622 | B1 | * | 9/2001 | Barajas et al. | 526/78 |
| 6,331,229 | B1 | * | 12/2001 | Wong Shing et al. | 162/168.3 |
| 6,432,271 | B1 | * | 8/2002 | Wong Shing et al. | 162/168.3 |
| 6,444,091 | B1 | * | 9/2002 | Ward et al. | 162/164.1 |
| 6,451,169 | B1 | * | 9/2002 | Ward et al. | 162/164.1 |

FOREIGN PATENT DOCUMENTS

| | | | |
|---|---|---|---|
| CN | 1179270 | | 4/1998 |
| GB | 2268422 | * | 1/1994 |
| JP | 61197008 | * | 9/1986 |
| JP | 08229598 | | 9/1996 |

OTHER PUBLICATIONS

Levic, L., Delic, I., Levic, J., English Abstract, "Separation of macromolecular compounds from brewer's spent grain wastewater", Fac. Chem. Technol., Univ. Novi Sad, Yugoslavia, Hemijska Industrija (1993), 47 (1-3), 8-10.*

Levic, L., Delic, I., Levic, J., "Separation of macromolecular compounds from brewer's spent grain wastewater", Fac. Chem. Technol., Univ. Novi Sad, Yugoslavia, Hemijska Industrija (1993), 47 (1-3), 8-10. (English Translation).*

Minowa, T., Yokoyama, S., Koguchi, K., Ogi, T., Takahashi T., English Abstract, "The characteristics of dewatering ethanol fermentation stillage" (Part 1), Fuel Dep., Kogai Shigen Kenkyusho, Ibaraki, Japan, Kogai Shigen Kenkyusho Iho (1989), 18(2), 1-12.

Minowa, T., Yokoyama, S., Ogi T., Dote, Y., English Abstract, "The characteristics of dewatering of ethanol fermentation stillage" (Part 2), Fuel Dep., Kogai Shigen Kenkyusho, Tsukuba, Japan, Kogai Shigen Kenkyusho Iho (1990), 19(1), 13-24.

Silva, D.A., Majela, G., English Abstract, "Treatment and agroindustrial use of distillery wastes", TAA/PLANACSUCAR—Programa Nacional de Melhoramento da Cana de Acucar, Brazil, Braz Pedido PI, 4 pp., Dec. 21, 1982.

* cited by examiner

*Primary Examiner*—C. Sayala
(74) *Attorney, Agent, or Firm*—William J. Maheras; Michael B. Martin

(57) ABSTRACT

A method of dewatering corn stillage solids comprising adding to the solids an effective coagulating and flocculating amount of an anionic copolymer comprising acrylic acid sodium salt, methacrylic acid sodium salt or 2-acrylamido-2-methyl-1-propanesulfonic acid sodium salt to form a mixture of water and coagulated and flocculated solids; and separating the water from the coagulated and flocculated solids using a dewatering device.

17 Claims, No Drawings

METHOD OF DEWATERING GRAIN STILLAGE SOLIDS

TECHNICAL FIELD

This invention relates to a method of dewatering grain stillage solids in the processing of grain to ethanol. More particularly, this invention concerns using anionic polymer dewatering aids in combination with a dewatering apparatus to enhance solid-liquid separation and increase the overall efficiency of the dewatering process.

BACKGROUND OF THE INVENTION

In the dry milling process for manufacturing both food and fuel grades of ethanol from corn and other grains a "beer mash" is made from which the ethanol is removed in a stripper column. The remaining mash is referred to as whole stillage or thick stillage in the fuel ethanol industries and thick slop in the beverage industry. The stillage which is typically 11% to 14% solids and contains all of the other non-starch components of the grains that pass through the process (germ, protein, gluten, hull & fiber etc.). Horizontal dewatering centrifuges are then typically used for removing a portion of the solids from the thick stillage.

The resulting solids, which contain about 65 to 85 percent water, are sent to a drying operation where the solids are dried to less than about 10% percent moisture. The dried solids, referred to as dry distiller grains (DDG's) are used as a nutrient source in animal feed. To manufacture animal feed, it is critical to attain 10% or less moisture because it makes the feed less susceptible to mold and microbial breakdown, which is desirable for long term storage and transport. The energy costs associated with the drying of DDG's can be reduced with more effective dewatering.

The liquid stream from the dewatering device is called centrate (thin stillage), which contains about 6-8 percent solids by weight, about 3 to 4% as suspended solids about 3 to 4% as dissolved solids. A fraction of the centrate or thin stillage is sent back to fermentation and is called backset. Another portion is sent to evaporators for concentration to a syrup which is then blended with DDG's to produce an animal feed referred to as wet feed. Centrate containing high amounts of suspended solids cause efficiency problems (through deposition) in the evaporators, so it is desirable to minimize the amount of solids in the centrate.

The current standard in the industry is the use of high speed horizontal decanter type centrifuges for processing and dewatering of the whole stillage or thick slop. The centrifuges are effective in capturing a portion of the whole stillage stream, which they process. Due to the high shear imparted in the unit a considerable portion of the smaller particles (fines) or the larger particles which are sheared can pass through the unit and are discharged in the centrate. Other drawbacks of centrifuges are the high cost of operation (energy usage) and frequent maintenance and repair.

Therefore, there continues to be an ongoing need for improved dewatering aids and dewatering methods which improve the efficiency of solid-liquid separation in the whole stillage, with concomitant reduction in the energy required to prepare the dry distiller grains

SUMMARY OF THE INVENTION

We have discovered that the use of certain anionic polymer dewatering aids significantly improve the dewaterability of the whole stillage in a variety of dewatering devices. The improvement observed is both in the rate at which the water is removed, drawn or filtered from the whole stillage and also the impact that this has on filter cake or on solids dryness and quality of the centrate produced. In certain dewatering devices this improved dewaterability will also allow for the use of filtration media with smaller pore sizes which permits better filtration, improved solids capture efficiency and reduced solids in the thin stillage.

Accordingly, this invention is a method of dewatering grain stillage solids comprising
(i) adding to the solids an effective coagulating and flocculating amount of an anionic polymer comprising one or more anionic monomers selected from acrylic acid sodium salt, 2-acrylamido-2-methyl-1-propanesulfonic acid sodium salt and methacrylic acid sodium salt and optionally one or more acrylamide monomers to form a mixture of water and coagulated and flocculated solids; and
(ii) separating the water from the coagulated and flocculated solids using a dewatering device.

The use anionic polymers in the dewatering process described herein significantly improves the flux rate of the filter device. As a result of the flux rate improvement it allows the devices to achieve cake solids of greater than 50 percent solids. The anionic polymer of this invention is most preferred in low shear dewatering apparatus, but has shown activity in high shear applications. The improvement in dewaterability significantly reduces the time required to process the stillage and thereby improves plant efficiency and throughput. The reductions in suspended solids in the thin stillage, which also result from the addition of the anionic flocculants described in this invention can be a significant benefit to the process operations.

DETAILED DESCRIPTION OF THE INVENTION

The method of this invention is suitable for dewatering all manner of grain stillage solids, including stillage solids resulting from the fermentation of corn, rice, rye, barley, malts, and the like.

The method is particularly suitable for dewatering corn stillage solids.

The anionic polymers suitable for use in the method of this invention are prepared by polymerizing acrylic acid sodium salt, methacrylic acid sodium salt or 2-acrylamido-2-methyl-1-propanesulfonic acid sodium salt or a combination thereof and optionally one or more acrylamide monomers under free radical forming conditions using methods known in the art of polymer synthesis. The anionic polymers are also commercially available, for example from Ondeo Nalco Company, Naperville, Ill.

"Acrylamide monomer" means an electrically neutral monomer derived from acrylamide. Representative acrylamide monomers include acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, and the like. Preferred acrylamide monomers include acrylamide and methacrylamide. Acrylamide is more preferred.

The anionic polymer may be cross-linked with about 0.005 to about 10 ppm of one or more cross linking agents. "Cross-linking agent" means a multifunctional monomer that when added to polymerizing monomer or monomers results in "cross-linked" polymers in which a branch or branches from one polymer molecule become attached to other polymer molecules. Representative cross-linking agents include N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal, vinyltrialkoxysilanes and the like. Preferred cross-linking agents are selected from N,N-methylenebisacrylamide, polydiethyleneglycoldimethacrylate, trimethylolpropane ethoxylate (x EO/y OH) tri(meth)acrylate, where x=1-20 and y=1-5, trimethylolpropane propoxylate (x EO/y OH) triacrylate, where x=1-3 and y=1-3, and 2-hydroxyethylmethacrylate.

Preferred anionic polymers for use in the method of this invention include dry polymers, emulsion polymers and dispersion polymers. Dry polymers and emulsion polymers are more preferred.

"Emulsion polymer" and "latex polymer" mean an invertible water-in-oil polymer emulsion comprising an anionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis(isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing the emulsion polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 30° C. to about 85° C. over about 1 to about 24 hours, preferably at a temperature of from about 40° C. to about 70° C. over about 3 to about 6 hours.

"Dispersion" polymers mean a water-soluble polymer dispersed in an aqueous continuous phase containing one or more inorganic salts. Representative examples of dispersion polymerization of water-soluble anionic and nonionic monomers in an aqueous continuous phase can be found in U.S. Pat. Nos. 5,605,970, 5,837,776, 5,985,992 and 6,265,477.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. Water-continuous dispersions of water-soluble polymers are free flowing liquids with product viscosities generally 100-10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

"Dry polymer" means a polymer prepared by gel polymerization. "Gel" polymerization is defined as a process for producing polymers as dry powders. The preparation of high molecular weight water-soluble polymers as dry powders using a gel polymerization is generally performed as follows: an aqueous solution of water-soluble monomers, generally 20-60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

Anionic polymers suitable for use in the method of this invention preferably have an anionic charge of about 10 to about 100 mole percent, more preferably about 30 to about 70 mole percent.

In a preferred aspect of this invention, the anionic polymer is selected from the group consisting of acrylamide-acrylic acid sodium salt copolymer and acrylamide-2-acrylamido-2-methyl-1-propanesulfonic acid sodium salt copolymer.

In another preferred aspect, acrylamide-acrylic acid sodium salt copolymer and acrylamide-2-acrylamido-2-methyl-1-propanesulfonic acid sodium salt copolymer have an anionic charge of about 10 to about 90 mole percent.

In another preferred aspect, acrylamide-acrylic acid sodium salt copolymer and acrylamide-2-acrylamido-2-methyl-1-propanesulfonic acid sodium salt copolymer have an anionic charge of about 30 to about 70 mole percent.

In another preferred embodiment, the anionic polymer is acrylamide-sodium acrylate-sodium methacrylate terpolymer.

In another preferred embodiment, the acrylamide-sodium acrylate-sodium methacrylate terpolymer has an anionic charge of about 1 to about 50 mole percent.

The anionic polymers preferably have a reduced specific viscosity of about 10 to about 60 dl/g, more preferably about 15 to about 40 dl/g.

"Reduced specific viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

The effective dosage, addition point(s) and mode of addition of anionic polymer to the thick slop or whole stillage can be empirically determined to obtain the proper polymer/particle interaction and optimize the chemical treatment program performance. For higher RSV product samples more mixing is typically required. For lower RSV polymers less mixing is required.

The anionic polymer dosage required for optimum dewatering is based upon a number of factors including inverted polymer concentration, whole stillage or thick slop feed solids, available polymer/particle mixing energy and the type of dewatering device used. A preferred polymer dosage is about 50 to about 500 ppm of anionic polymer is added to the thick slop or whole stillage process stream.

Emulsion polymers are typically inverted as a 0.1 to 5.0 percent by weight solution in clean water according to standard practices for inverting latex flocculants as described herein. The polymer is applied to the whole stillage or thick slop process stream. Dry anionic polymer flocculants are used in a similar fashion with the product being made up at concentrations of 0.1 to 1.5 percent polymer product according to the standard practices and recommended polymer aging times for preparing dry flocculants.

Separation of the water from the coagulated and flocculated grain stillage solids may be accomplished using any means commonly used for solid-liquid separation. Preferred separation devices include centrifuges, vacuum filtration devices, for example rotary vacuum filtration devices, recessed chamber presses, plate and frame filter presses, screw presses, belt filter presses, and the like.

The foregoing may be better understood by reference to the following Examples, which are presented for purposes of illustration and are not intended to limit the scope of this invention. Polymers used in the Examples are available from Ondeo Nalco Company, Naperville, Ill.

EXAMPLE 1

Thick slop from a bourbon production facility is placed in a 105° C. oven and determined to contain 13.5% by weight solids. A vacuum filter apparatus is assembled and 250 ml of the untreated "thick slop" is placed in the filter apparatus. After 15 minutes the material in the top of the funnel (filter cake) is removed and placed in a pre-weighed jar for percent moisture analysis. The same procedure is followed for thick slop treated with 100, 200 and 300 ppm of a sodium acrylate-acrylamide copolymer, having an anionic charge of about 30 mole percent and a reduced specific viscosity range of 20-30 dl/g prior to being placed in the vacuum filter for 15 minutes. Results of the testing are shown in Table 1.

TABLE 1

| Polymer Dosage (ppm) | Filter Cake Solids (%) |
| --- | --- |
| 0 | 11.2 |
| 100 | 24.6 |
| 200 | 24.7 |
| 300 | 24.5 |
| 0 | 10.8 |

As shown in Table 1, cake solids increases by over 50% when a representative anionic polymer dewatering aid of this invention are used.

EXAMPLE 2

Thick slop sample obtained from a bourbon production facility is placed in a 105° C. oven for 24 hours and determined to contain 11.9% by weight solids. The same vacuum filter apparatus as described in example 1 is used for this experiment. After 30 minutes the material from the top of the funnel (filter cake) is removed and placed in a pre-weighed jar for percent moisture analysis. The same procedure is followed for thick slop treated with 200 ppm of the polymer used in Example 1 prior to being placed in the vacuum filter for 15 minutes. Results of the testing are shown in Table 2.

TABLE 2

| Polymer Dosage (ppm) | Filter Cake Solids (%) |
| --- | --- |
| 0 | 10.3 |
| 200 | 20.8 |

As shown in Table 2, cake solids increase by greater than 50% and, more importantly the filtration time is reduced by half by using a representative anionic polymer dewatering aid of this invention.

EXAMPLE 3

A whole stillage stream is treated in a fuel grade ethanol production facility. Testing is conducted using an existing commercial horizontal decanter centrifuge in operation in the plant. An acrylamide/sodium acrylate copolymer having an anionic charge of about 30 mole percent and a reduced specific viscosity range of 25-35) is applied to the stillage stream prior to the centrifuge. A sample of the whole stillage stream is obtained and placed in a 105° C. oven for 24 hours and determined to contain 15.74% by weight solids.

TABLE 3

| Polymer Dosage (ppm) | % TSS in centrate |
| --- | --- |
| 0 | 4.1 |
| 30 | 3.7 |
| 90 | 3.5 |
| 150 | 3.4 |
| 200 | 3.5 |
| 300 | 3.2 |
| 350 | 3.0 |

The data shown in Table 3 show that the application of the anionic polymer results in a 0.4% to 1.1% decrease in solids in the centrate. The cake solids did not significantly change and remaine in a range of 15.0-15.8%.

Examples 1 and 2 evaluate the dewaterability in the free drainage zone of the dewatering device and not the high pressure or squeeze zone of the press. However, removal of water in the free drainage zone results in less water that must be removed in the pressure zone, thereby resulting in a much drier material after pressure filtration and a much dryer material going to the dryers. Further testing shows that cake solids of greater than 50 percent solids can be obtained.

Example 3 evaluates the addition of the anionic polymer in a high shear device. While the results are not as dramatic as in Examples 1 and 2, there is a significant performance improvement, mainly in the capture of fines, thus giving cleaner effluent.

Changes can be made in the composition, operation and arrangement of the method of the invention described herein without departing from the concept and scope of the invention as defined in the claims.

The invention claimed is:

1. A method of dewatering grain stillage solids comprising
   (i) adding to the solids an effective coagulating and flocculating amount of an anionic polymer comprising one or more anionic monomers selected from acrylic acid sodium salt, 2-acrylamido-2-methyl-1-propanesulfonic acid sodium salt and methacrylic acid sodium salt and optionally one or more acrylamide monomers to form a mixture of water and coagulated and flocculated solids; and
   (ii) separating the water from the coagulated and flocculated solids using a dewatering device.

2. The method of claim 1 wherein the anionic polymer is selected from the group consisting of dry polymers, emulsion polymers and dispersion polymers.

3. The method of claim 1 wherein the anionic polymer has an anionic charge of about 10 to about 100 mole percent.

4. The method of claim 1 wherein the anionic polymer has a reduced specific viscosity of about 10 to about 60 dl/g.

5. The method of claim 1 wherein the acrylamide monomer is acrylamide.

6. The method in claim 1 where the anionic polymer further comprises about 0.005 to about 10 ppm of one or more cross linking agents.

7. The method of claim 6 wherein the cross linking agents are selected from polyethyleneglycol(400)-dimethacrylate or trimethylolpropane ethoxylate (14EO/3OH) tri(meth)acrylate.

8. The method of claim 1 wherein the anionic polymer is selected from the group consisting of acrylamide-acrylic acid sodium salt copolymer and acrylamide-2-acrylamido-2-methyl-1-propanesulfonic acid sodium salt copolymer.

9. The method of claim 8 wherein the anionic polymer has an anionic charge of about 10 to about 90 mole percent.

10. The method of claim 8 wherein the anionic polymer has an anionic charge of about 30 to about 70 mole percent.

11. The method of claim 1 wherein the anionic polymer is acrylamide-sodium acrylate-sodium methacrylate terpolymer.

12. The method of claim 11 wherein the anionic polymer has an anionic charge of about 1 to about 50 mole percent.

13. The method of claim 4 wherein the anionic polymer is selected from the group consisting of dry polymers and emulsion polymers.

14. The method of claim 13 wherein the anionic polymer has a reduced specific viscosity of about 15 to about 40 dl/g.

15. The method of claim 1 wherein about 50 to about 1000 ppm of anionic polymer is added to the grain stillage solids.

16. The method of claim 15 wherein the grain stillage solids are corn stillage solids.

17. The method of claim 1 wherein the dewatering device is selected from the group consisting of centrifuges, vacuum filtration devices, recessed chamber presses, plate and frame filter presses, screw presses and belt filter presses.

* * * * *